United States Patent
Yang et al.

(10) Patent No.: US 12,238,647 B2
(45) Date of Patent: Feb. 25, 2025

(54) ENERGY CONSERVATION SIGNAL TRANSMISSION METHOD, BASE STATION, AND TERMINAL DEVICE

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Chen Luo, Beijing (CN); Zheng Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 497 days.

(21) Appl. No.: 17/631,508

(22) PCT Filed: May 28, 2020

(86) PCT No.: PCT/CN2020/093026
§ 371 (c)(1),
(2) Date: Jan. 31, 2022

(87) PCT Pub. No.: WO2021/017603
PCT Pub. Date: Feb. 4, 2021

(65) Prior Publication Data
US 2022/0303901 A1    Sep. 22, 2022

(30) Foreign Application Priority Data

Aug. 1, 2019    (CN) .......................... 201910709173.3

(51) Int. Cl.
*H04W 52/02*    (2009.01)

(52) U.S. Cl.
CPC ... *H04W 52/0232* (2013.01); *H04W 52/0235* (2013.01); *H04W 52/0274* (2013.01)

(58) Field of Classification Search
CPC ......... H04W 52/0232; H04W 52/0235; H04W 52/0274

(Continued)

(56) References Cited

U.S. PATENT DOCUMENTS

2015/0271868 A1*  9/2015  Rune .................. H04W 4/70
                                                          370/311
2018/0091993 A1    3/2018  Siomina
(Continued)

FOREIGN PATENT DOCUMENTS

| CN | 104301065 A | 1/2015 |
| CN | 108200640 A | 6/2018 |
| WO | 2014112751 A1 | 7/2014 |

OTHER PUBLICATIONS

ZTE Corporation et al., "Consideration on power saving scheme with DRX adaptation", 3GPP TSG-RAN WG2 Meeting#105, Athens, Greece, Feb. 25-Mar. 1, 2019, total 5 pages, R2-1900623.
Vivo, "Multiple DRX Configurations for Power Saving", 3GPP TSG-RAN WG2 Meeting #106, Reno, USA, May 13-17, 2019, total 3 pages, R2-1905959(Revision of R2-1903203).
Huawei et al., "Signaling based mechanisms for UE power saving", 3GPP TSG RAN WG1 Meeting #94bis, Chengdu, China, Oct. 8-12, 2018, total 7 pages, R1-1810155.
(Continued)

*Primary Examiner* — Faisal Choudhury
(74) *Attorney, Agent, or Firm* — Kilpatrick Townsend & Stockton LLP

(57) ABSTRACT

Disclosed are an energy conservation transmission method, base station, and terminal device; the base station can configure an energy conservation signal for the terminal device; the energy conservation signal carries energy conservation information; the energy conservation information can indicate a first configuration of at least one discontinuous reception (DRX) cycle of the terminal device, the at least one DRX cycle comprising at least one first cycle and/or at least one second cycle; the first cycle and the second cycle are long cycles and/or short cycles, and the first cycle is different from the second cycle; the first configuration of the DRX cycle includes at least one of the maximum number N of DRX cycles, the maximum number K of
(Continued)

the first cycle, and the number Y of the first cycle, all of N, K, and Y being integers greater than or equal to 1; thus the energy conservation signal can indicate to the terminal device for any combination of DRX cycles of different lengths, solving the problem in the prior art of how to configure the number of DRX cycles indicated by the energy conservation signal.

18 Claims, 4 Drawing Sheets

(58) Field of Classification Search
USPC .......................................................... 370/318
See application file for complete search history.

(56) References Cited

U.S. PATENT DOCUMENTS

2019/0053160 A1    2/2019  He et al.
2019/0166577 A1*   5/2019  Tombaz ................ H04W 68/02

OTHER PUBLICATIONS

CATT,"PDCCH skipping and switching of PDCCH monitoring periodicity", 3GPP TSG RAN WG1 Meeting #97, Reno, USA, May 13-17, 2019, total 6 pages, R1-1906353.

* cited by examiner

Configuring an energy-saving signal for a terminal device, where the energy-saving signal carries energy-saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1 — S101

Sending the energy-saving signal to the terminal device — S102

Fig. 1

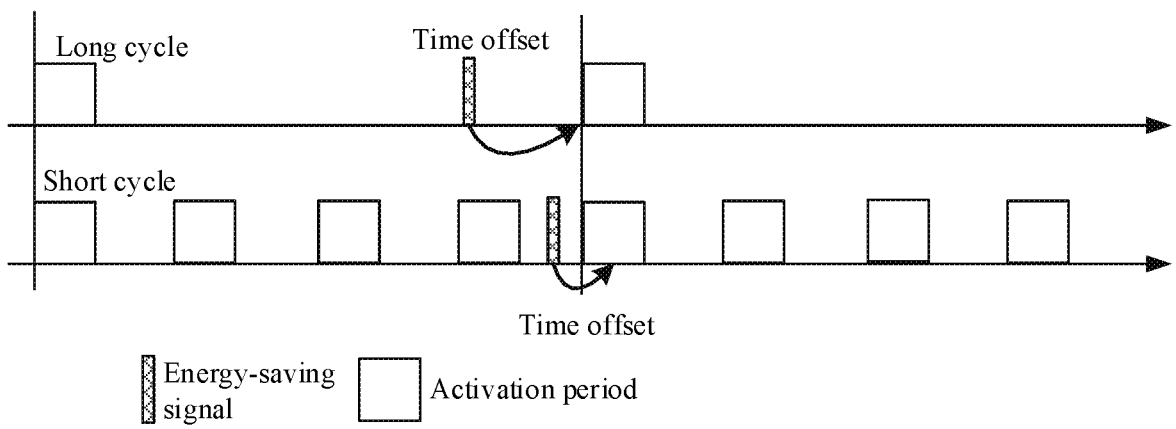

Fig. 2

ENERGY CONSERVATION SIGNAL TRANSMISSION METHOD, BASE STATION, AND TERMINAL DEVICE

CROSS-REFERENCE OF RELATED APPLICATIONS

The present application is a National Stage of International Application No. PCT/CN2020/093026, filed on May 28, 2020, which claims the priority from Chinese Patent Application No. 201910709173.3, filed with the Chinese Patent Office on Aug. 1, 2019 and entitled "Energy-Saving Signal Transmission Method, Base Station and Terminal Device", both of which are hereby incorporated by reference in their entireties.

FIELD OF DISCLOSURE

The present disclosure relates to the field of communication technology, and in particular to an energy saving signal transmission method, a base station and a terminal device.

BACKGROUND

In the R16 version of the 5th generation communication technology (5G) standard of the 3rd Generation Partnership Project (3GPP), the energy saving topic of a User Equipment (UE) in the Working Item (WI) of the New Radio (NR) item (WI) proposes the use of a Wake-Up Signal (WUS) based on a Physical Downlink Control Channel (PDCCH) to indicate the energy saving information of the UE. The energy saving information includes at least one of: cross-slot scheduling information, information triggering reference signal transmission, Channel State Information (CSI), Bandwidth Partial (BWP)/Secondary cell (Scell) switching information, Multiple Input Multiple Output (MIMO) layer number adjustment/antenna number adjustment information, Control Resource Set (CORESET), search space and candidate location indication information, PDCCH monitoring period information, PDCCH skip indication information, etc.

The energy saving signal can indicate whether the terminal needs to detect the information such as the PDCCH of the base station in the next Discontinuous Reception (DRX) cycle, and the terminal can monitor the energy saving signal with the lower power and skip the subsequent invalid PDCCH monitoring, to achieve the effect of reducing the power consumption of the terminal. In order to achieve the above effect, the energy saving signal needs to be designed together with the Connected mode DRX (C-DRX) parameters in the continuous state. The standard stipulates that an energy saving signal can indicate multiple DRX cycles, and the energy saving signal can be sent at the offset before DRX activation. However, there are following cases in the above design.

The energy saving signal supported in the Long Term Evolution (LTE) Machine Type Communication (MTC) is designed based on sequence, which is used to indicate whether there is a paging transmission in a next paging cycle. The difference between terminal energy saving in NR and LTE MTC is: the NR mainly focuses on energy saving in the connected state, and there are long and short DRX configuration cycles in the NR, for example, the short DRX cycle is 2 ms and the long DRX cycle is 10240 ms. And, the service types in the connected state are widely distributed. In order to flexibly support various service types, the DRX cycles of the NR are usually a combination of shortDRXcycle and longDRXcycle. If an energy saving signal indicates a next DRX cycle, then it is necessary to send the energy saving signal frequently when the DRX cycle is relatively short, and the good energy saving effect cannot be achieved. When the DRX cycle is relatively long and an energy saving signal can indicate multiple DRX cycles, if there is an indication error of the energy saving signal or the energy saving signal is missed, the transmission delay may be increased and the terminal performance may be reduced. Therefore, how to configure the quantity of DRX cycles indicated by the energy saving signal is a problem to be solved urgently at present.

BRIEF SUMMARY

The embodiments of the present disclosure provide an energy saving signal transmission method and configuration method, a base station and a terminal device, so as to solve the problem of how to configure the quantity of DRX cycles indicated by the energy saving signal in the prior art.

In a first aspect, an embodiment of the present disclosure provides an energy saving signal transmission method applied to a base station, including:

configuring an energy saving signal for a terminal device, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1;

sending the energy saving signal to the terminal device.

In one embodiment, in response to the first configuration of the DRX cycle comprising the maximum quantity N of DRX cycles, the energy saving information is used to indicate at most N DRX cycles after the energy saving signal currently sent by the base station to the terminal device, and the at most N DRX cycles include at least one first cycle and/or at least one second cycle, a quantity of DRX cycles indicated by the energy saving signal is N1, a quantity of DRX cycles indicated by an energy saving signal previously sent by the base station to the terminal device is N2, N1 and N2 are same with each other or different from each other, N1 is less than or equal to N, and N2 is less than or equal to N;

in response to the first configuration of the DRX cycle comprising the maximum quantity K of first cycles, the energy saving information is used to indicate at most K first cycles after the energy saving signal currently sent by the base station this time; a quantity of DRX cycles indicated by the energy saving signal currently sent is K1, a quantity of DRX cycles indicated by an energy saving signal previously by the base station to the terminal device is K2, K1 and K2 are same with each other or different from each other, K1 is less than or equal to K, and K2 is less than or equal to K;

in response to the first configuration of the DRX cycle comprising the quantity Y of first cycles, the energy saving information is used to indicate a configuration of Y first cycles after the energy saving signal currently sent by the base station.

In one embodiment, the sending the energy saving signal to the terminal device, includes:

sending the energy saving signal to the terminal device before an activation moment of the terminal device; or sending the energy saving signal to the terminal device at the activation moment of the terminal device; or sending the energy saving signal to the terminal device when the terminal device is in an activated state.

In one embodiment, before sending the energy saving signal to the terminal device, the method further includes:

determining whether to send the energy saving signal according to a candidate location of a sending moment of the energy saving signal and information of a first cycle in which the terminal device is currently located, and it is determined to send the energy saving signal in response to the candidate location of the sending moment comprising any one of following cases:

the candidate location of the sending moment is equal to an integer multiple of a time length of the Y first cycles; or the candidate location of the sending moment is equal to an integer multiple of a time length of the maximum N DRX cycles; or the candidate location of the sending moment is equal to an integer multiple of a time length of the maximum K first cycles; or the candidate location of the sending moment is located in a time window of an integer multiple of a time length of the Y first cycles; or the candidate location of the sending moment is located in a time window of an integer multiple of a time length of the maximum K first cycles; or the candidate location of the sending moment is located in a time window of an integer multiple of a time length of the maximum N DRX cycles; or the candidate location of the sending moment is equal to an integer multiple of a time length of the Y first cycles, and the candidate location of the sending moment is located in a time window before an activation period of an integer multiple of the time length of the Y first cycles; or the candidate location of the sending moment is equal to an integer multiple of a time length of the maximum K first cycles, and the candidate location of the sending moment is located in a time window before an activation period of an integer multiple of the time length of the maximum K first cycles; or the candidate location of the sending moment is equal to an integer multiple of a time length of the maximum N DRX cycles, and the candidate location of the sending moment is located in a time window before an activation period of an integer multiple of the time length of the maximum N DRX cycles; or the candidate location of the sending moment is located in an overlapping part of an activation period of at least one first cycle in which the terminal device is currently located, and a time window before an activation period of at least one subsequent first cycle and/or second cycle of the terminal device.

In one embodiment, it is determined not to send or skip sending the energy saving signal in response to the candidate location of the sending moment including any one of following cases:

the candidate location of the sending moment is located at a start moment or an end moment of a first cycle, or in the first cycle; or the candidate location of the sending moment is outside a time window before an activation period of a first cycle; or the candidate location of the sending moment is located in a first cycle, and a next DRX cycle indicated by the energy saving signal is a second cycle; or the candidate location of the sending moment is located in an overlapping part of an activation period of a first cycle in which the terminal device is currently located, and a time window before an activation period of a next DRX cycle of the terminal device, and the next DRX cycle is a first cycle or second cycle.

In one embodiment, before sending the energy saving signal to the terminal device, the method further includes:

sending a time offset or a maximum time offset corresponding to at least one energy saving signal to the terminal device, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the sending the energy saving signal to the terminal device, includes:

sending the energy saving signal to the terminal device in response to determining that the candidate location of the sending moment of the energy saving signal is located in any time window as follows;

and the time window includes:

a time window of a start point and an end point, the start point is a first time offset before an activation period of a current DRX cycle, and the end point is a start moment of the activation period of the current DRX cycle, and the current DRX cycle is the first cycle or second cycle; or a time window of a start point and an end point, the start part is a first time offset before an activation period of the current DRX cycle, and the end point is an end moment of the activation period of the current DRX cycle; or a time window of a start point and an end point, the start point is a second time offset in the current DRX cycle, and the end point is an end moment of the current DRX cycle;

and the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, in response to the first configuration of the DRX cycle including the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals sent by the base station to the terminal device.

In a second aspect, an embodiment of the present disclosure provides an energy saving signal transmission method applied to a terminal device, including:

receiving an energy saving signal sent by a base station, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1.

In one embodiment, in response to the first configuration of the DRX cycle comprising the maximum quantity N of DRX cycles, the energy saving information is used to indicate at most N DRX cycles after the energy saving signal sent currently by the base station to the terminal device, and the at most N DRX cycles include at least one first cycle and/or at least one second cycle, a quantity of DRX cycles indicated by the energy saving signal is N1, a quantity of DRX cycles indicated by an energy saving signal previously sent by the base station to the terminal device is N2, N1 and N2 are same with each other or different from each other, N1 is less than or equal to N, and N2 is less than or equal to N;

in response to the first configuration of the DRX cycle comprising the maximum quantity K of first cycles, the energy saving information is used to indicate at most K first cycles after the energy saving signal currently sent by the base station; a quantity of DRX cycles indicated by the energy saving signal currently sent is K1, a quantity of DRX cycles indicated by an energy saving signal previously sent by the base station to the terminal device is K2, K1 and K2 are same with each other or different from each other, K1 is less than or equal to K, and K2 is less than or equal to K;

in response to the first configuration of the DRX cycle comprising the quantity Y of first cycles, the energy saving information is used to indicate a configuration of Y first cycles after the energy saving signal currently sent by the base station.

In one embodiment, the receiving the energy saving signal sent by the base station, includes:

receiving the energy saving signal before an activation moment of the terminal device; or receiving the energy saving signal at an activation moment of the terminal device; or receiving the energy saving signal when the terminal device is in an activated state.

In one embodiment, before receiving the energy saving signal, the method further includes:

determining whether to receive the energy saving signal according to a candidate location for receiving the energy saving signal and information of a first cycle in which the terminal device is currently located, and it is determined to receive the energy saving signal in response to the candidate location for receiving the energy saving signal comprising any one of following cases:

the candidate location for receiving the energy saving signal is equal to an integer multiple of a time length of the Y first cycles; or the candidate location for receiving the energy saving signal is equal to an integer multiple of a time length of the maximum N DRX cycles; or the candidate location for receiving the energy saving signal is equal to an integer multiple of a time length of the maximum K first cycles; or the candidate location for receiving the energy saving signal is located in a time window being an integer multiple of a time length of the Y first cycles; or the candidate location for receiving the energy saving signal is located in a time window being an integer multiple of a time length of the maximum K first cycles; or the candidate location for receiving the energy saving signal is located in a time window being an integer multiple of a time length of the maximum N DRX cycles; or the candidate location for receiving the energy saving signal is equal to an integer multiple of a time length of the Y first cycles, and the candidate location for receiving the energy saving signal is located in a time window before an activation period being an integer multiple of the time length of the Y first cycles; or the candidate location for receiving the energy saving signal is equal to an integer multiple of a time length of the maximum K first cycles, and the candidate location for receiving the energy saving signal is located in a time window before an activation period being an integer multiple of the time length of the maximum K first cycles; or the candidate location for receiving the energy saving signal is equal to an integer multiple of a time length of the maximum N DRX cycles, and the candidate location for receiving the energy saving signal is located in a time window before an activation period being an integer multiple of the time length of the maximum N DRX cycles; or the candidate location for receiving the energy saving signal is located in an overlapping part of an activation period of at least one first cycle in which the terminal device is currently located, and a time window before an activation period of at least one subsequent first cycle and/or second cycle of the terminal device.

In one embodiment, it is determined not to send or skip sending the energy saving signal in response to the candidate location for receiving the energy saving signal including any one of following cases:

the candidate location for receiving the energy saving signal is located at a start moment or an end moment of a first cycle in which the terminal device is currently located, or in the first cycle; or the candidate location for receiving the energy saving signal is located outside a time window before an activation period of a first cycle in which the terminal device is currently located; or the candidate location for receiving the energy saving signal is located in a first cycle, and a next DRX cycle indicated by the energy saving signal is a second cycle; or the candidate location for receiving the energy saving signal is located in an overlapping part of an activation period of a first cycle in which the terminal device is currently located, and a time window before an activation period of a next DRX cycle of the terminal device, and the next DRX cycle is a first cycle or second cycle.

In one embodiment, before receiving the energy saving signal, the method further includes:

receiving a time offset or a maximum time offset corresponding to at least one energy saving signal sent by the base station, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the receiving the energy saving signal sent by the base station, includes:

receiving the energy saving signal in response to determining that the candidate location for receiving the energy saving signal being located in any time window as follows; and the time window includes:

a time window of a start point and an end point, the start point is a first time offset before an activation period of a current DRX cycle, and the end point is a start moment of the activation period of the current DRX cycle, and the current DRX cycle is the first cycle or second cycle; or a time window of a start point and an end point, the start point is a first time offset before an activation period of the current DRX cycle, the end point is an end moment of the activation period of the current DRX cycle; or a time window of a start point and an end point, the start point is a second time offset in the current DRX cycle as a start point and an end moment of the current DRX cycle as an end point;

and the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, in response to the first configuration of the DRX cycle including the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals received by the terminal device from the base station.

In a third aspect, an embodiment of the present disclosure provides a base station, including:

a memory configured to store instructions;

a processor configured to read the instructions in the memory to perform the process of:

configuring an energy saving signal for a terminal device, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1;

sending the energy saving signal to the terminal device.

In one embodiment, in response to the first configuration of the DRX cycle comprising the maximum quantity N of DRX cycles, the energy saving information is used to indicate at most N DRX cycles after the energy saving signal currently sent by the base station to the terminal device, and the at most N DRX cycles include at least one first cycle and/or at least one second cycle, a quantity of DRX cycles indicated by the energy saving signal is N1, a quantity of DRX cycles indicated by an energy saving signal previously sent by the base station to the terminal device is N2, N1 and N2 are same with each other or different from each other, N1 is less than or equal to N, and N2 is less than or equal to N;

in response to the first configuration of the DRX cycle comprising the maximum quantity K of first cycles, the energy saving information is used to indicate at most K first cycles after the energy saving signal currently sent by the base station this time; a quantity of DRX cycles indicated by the energy saving signal currently sent is K1, a quantity of DRX cycles indicated by an energy saving signal previously by the base station to the terminal device is K2, K1 and K2 are same with each other or different from each other, K1 is less than or equal to K, and K2 is less than or equal to K;

in response to the first configuration of the DRX cycle comprising the quantity Y of first cycles, the energy saving information is used to indicate a configuration of Y first cycles after the energy saving signal currently sent by the base station.

In one embodiment, the processor is configured to:

send the energy saving signal to the terminal device before an activation moment of the terminal device; or send the energy saving signal to the terminal device at the activation moment of the terminal device; or send the energy saving signal to the terminal device when the terminal device is in an activated state.

In one embodiment, before sending the energy saving signal to the terminal device, the processor is configured to:

determine whether to send the energy saving signal according to a candidate location of a sending moment of the energy saving signal and information of a first cycle in which the terminal device is currently located, and it is determined to send the energy saving signal in response to the candidate location of the sending moment including any one of following cases:

the candidate location of the sending moment is equal to an integer multiple of a time length of the Y first cycles; or the candidate location of the sending moment is equal to an integer multiple of a time length of the maximum N DRX cycles; or the candidate location of the sending moment is equal to an integer multiple of a time length of the maximum K first cycles; or the candidate location of the sending moment is located in a time window being an integer multiple of a time length of the Y first cycles; or the candidate location of the sending moment is located in a time window being an integer multiple of a time length of the maximum K first cycles; or the candidate location of the sending moment is located in a time window being an integer multiple of a time length of the maximum N DRX cycles; or the candidate location of the sending moment is equal to an integer multiple of a time length of the Y first cycles, and the candidate location of the sending moment is located in a time window before an activation period being an integer multiple of the time length of the Y first cycles; or the candidate location of the sending moment is equal to an integer multiple of a time length of the maximum K first cycles, and the candidate location of the sending moment is located in a time window before an activation period being an integer multiple of the time length of the maximum K first cycles; or the candidate location of the sending moment is equal to an integer multiple of a time length of the maximum N DRX cycles, and the candidate location of the sending moment is located in a time window before an activation period being an integer multiple of the time length of the maximum N DRX cycles; or the candidate location of the sending moment is located in an overlapping part of an activation period of at least one first cycle in which the terminal device is currently located, and a time window before an activation period of at least one subsequent first cycle and/or second cycle of the terminal device.

In one embodiment, it is determined not to send or skip sending the energy saving signal in response to the candidate location of the sending moment comprising any one of following cases:

the candidate location of the sending moment is located at a start moment or an end moment of a first cycle, or in the first cycle; or the candidate location of the sending moment is outside a time window before an activation period of a first cycle; or the candidate location of the sending moment is located in a first cycle, and a next DRX cycle indicated by the energy saving signal this time is a second cycle; or the candidate location of the sending moment is located in an overlapping part of an activation period of a first cycle in which the terminal device is currently located, and a time window before an activation period of a next DRX cycle of the terminal device, and the next DRX cycle is a first cycle or second cycle.

In one embodiment, before sending the energy saving signal to the terminal device, the processor is configured to:

send a time offset or a maximum time offset corresponding to at least one energy saving signal to the terminal device, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the processor is configured to:

send the energy saving signal to the terminal device in response to determining that a sending moment of the energy saving signal is located in a preset time window;

and the preset time window includes:

a time window of a start point and an end point, the start point is a first time offset before an activation period of a current DRX cycle and the end point is a start moment of the activation period of the current DRX cycle, and the current DRX cycle is the first cycle or second cycle; or a time window of a start point end and an end point, the start point is a first time offset before an activation period of the current DRX cycle, and the end point is an end moment of the activation period of the current DRX cycle; or a time window of a start point and an end point, the start point is a second time offset in the current DRX cycle, and the end point is an end moment of the current DRX cycle;

and the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, in response to the first configuration of the DRX cycle including the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals sent by the base station to the terminal device.

In a fourth aspect, an embodiment of the present disclosure provides a terminal device, including:

a memory configured to store instructions;

a processor configured to read the instructions in the memory to perform followings:

receiving an energy saving signal sent by a base station, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1.

In one embodiment, in response to the first configuration of the DRX cycle comprising the maximum quantity N of DRX cycles, the energy saving information is used to indicate at most N DRX cycles after the energy saving signal sent currently by the base station to the terminal device, and the at most N DRX cycles include at least one first cycle and/or at least one second cycle, a quantity of DRX cycles indicated by the energy saving signal is N1, a quantity of DRX cycles indicated by an energy saving signal previously sent by the base station to the terminal device is N2, N1 and N2 are same with each other or different from each other, N1 is less than or equal to N, and N2 is less than or equal to N;

in response to the first configuration of the DRX cycle comprising the maximum quantity K of first cycles, the energy saving information is used to indicate at most K first cycles after the energy saving signal currently sent by the base station; a quantity of DRX cycles indicated by the energy saving signal currently sent is K1, a quantity of DRX cycles indicated by an energy saving signal previously sent by the base station to the terminal device is K2, K1 and K2 are same with each other or different from each other, K1 is less than or equal to K, and K2 is less than or equal to K;

in response to the first configuration of the DRX cycle comprising the quantity Y of first cycles, the energy saving information is used to indicate a configuration of Y first cycles after the energy saving signal currently sent by the base station.

In one embodiment, the receiving the energy saving signal sent by the base station, includes:

receiving the energy saving signal before an activation moment of the terminal device; or receiving the energy saving signal at an activation moment of the terminal device; or receiving the energy saving signal when the terminal device is in an activated state.

In one embodiment, before receiving the energy saving signal, the processor is configured to:

determine whether to receive the energy saving signal according to a candidate location for receiving the energy saving signal and information of a first cycle in which the terminal device is currently located, and it is determined to receive the energy saving signal in response to the candidate location for receiving the energy saving signal including any one of following cases:

the candidate location for receiving the energy saving signal is equal to an integer multiple of a time length of the Y first cycles; or the candidate location for receiving the energy saving signal is equal to an integer multiple of a time length of the maximum N DRX cycles; or the candidate location for receiving the energy saving signal is equal to an integer multiple of a time length of the maximum K first cycles; or the candidate location for receiving the energy saving signal is located in a time window being an integer multiple of a time length of the Y first cycles; or the candidate location for receiving the energy saving signal is located in a time window being an integer multiple of a time length of the maximum K first cycles; or the candidate location for receiving the energy saving signal is located in a time window being an integer multiple of a time length of the maximum N DRX cycles; or the candidate location for receiving the energy saving signal is equal to an integer multiple of a time length of the Y first cycles, and the candidate location for receiving the energy saving signal is located in a time window before an activation period being an integer multiple of the time length of the Y first cycles; or the candidate location for receiving the energy saving signal is equal to an integer multiple of a time length of the maximum K first cycles, and the candidate location for receiving the energy saving signal is located in a time window before an activation period being an integer multiple of the time length of the maximum K first cycles; or the candidate location for receiving the energy saving signal is equal to an integer multiple of a time length of the maximum N DRX cycles, and the candidate location for receiving the energy saving signal is located in a time window before an activation period being an integer multiple of the time length of the maximum N DRX cycles; or the candidate location for receiving the energy saving signal is located in an overlapping part of an activation period of at least one first cycle in which the terminal device is currently located, and a time window before an activation period of at least one subsequent first cycle and/or second cycle of the terminal device.

In one embodiment, it is determined not to send or skip sending the energy saving signal in response to the candidate location for receiving the energy saving signal including any one of following cases:

the candidate location for receiving the energy saving signal is located at a start moment or an end moment of a first cycle in which the terminal device is currently located, or in the first cycle; or the candidate location for receiving the energy saving signal is located outside a time window before an activation period of a first cycle in which the terminal device is currently located; or the candidate location for receiving the energy saving signal is located in a first cycle, and a next DRX cycle indicated by the energy saving signal is a second cycle; or the candidate location for receiving the energy saving signal is located in an overlapping part of an activation period of a first cycle in which the terminal device is currently located, and a time window before an activation period of a next DRX cycle of the terminal device, and the next DRX cycle is a first cycle or second cycle.

In one embodiment, before receiving the energy saving signal, the processor is configured to:

receive a time offset or a maximum time offset corresponding to at least one energy saving signal sent by the base station, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the processor is configured to:

receive the energy saving signal in response to determining that the candidate location for receiving the energy saving signal is located in any time window as follows;

where the time window includes:

a time window of a start point and an end point, the start point is a first time offset before an activation period of a current DRX cycle, and the end point is a start moment of the activation period of the current DRX cycle, and the current DRX cycle is the first cycle or second cycle; or a time window of a start point and an end point, the start point is a first time offset before an activation period of the current DRX cycle, the end point is an end moment of the activation period of the current DRX cycle; or a time window of a start point and an end point, the start point is a second time offset in the current DRX cycle as a start point and an end moment of the current DRX cycle as an end point;

and the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, in response to the first configuration of the DRX cycle including the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals received by the terminal device from the base station.

In a fifth aspect, an embodiment of the present disclosure provides a base station, including:

a configuration device configured to configure an energy saving signal for a terminal device, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1;

a sending device configured to send the energy saving signal to the terminal device.

In a sixth aspect, an embodiment of the present disclosure provides a terminal device, including:

a receiving device configured to receive an energy saving signal sent by a base station, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1.

In a seventh aspect, an embodiment of the present disclosure provides a computer readable storage medium storing computer instructions thereon, where the computer instructions, when executed by a processor, implement the steps of the above method as described in the first aspect.

In an eighth aspect, an embodiment of the present disclosure provides a computer readable storage medium storing computer instructions thereon, where the computer instructions, when executed by a processor, implement the steps of the above method as described in the second aspect.

In the present disclosure, the base station may configure an energy saving signal for the terminal device, where the energy saving signal carries the energy saving information that can indicate the first configuration of at least one DRX cycle to the terminal device, the at least one DRX cycle includes at least one first cycle and/or at least one second cycle, the first cycle and the second cycle are long cycles and/or short cycles, and the first cycle is different from the second cycle; the first configuration of the DRX cycle includes at least one of the maximum quantity N of DRX cycles, the maximum quantity K of first cycles and the quantity Y of first cycles, where N, K and Y are all integers greater than or equal to 1, and the energy saving signal can indicate to the terminal device for any combination of DRX cycles with different lengths, to solve the problem of how to configure the quantity of DRX cycles indicated by the energy saving signal in prior art, and achieve the effects of improving the energy saving effect, reducing the transmission delay and improving the performance of the terminal device.

BRIEF DESCRIPTION OF THE DRAWINGS

FIG. 1 is a flowchart of an energy saving signal transmission method according to an embodiment of the present disclosure;

FIG. 2 is a schematic diagram of a configuration of a DRX cycle according to an embodiment of the present disclosure;

DETAILED DESCRIPTION OF THE EMBODIMENTS

Figure 3:
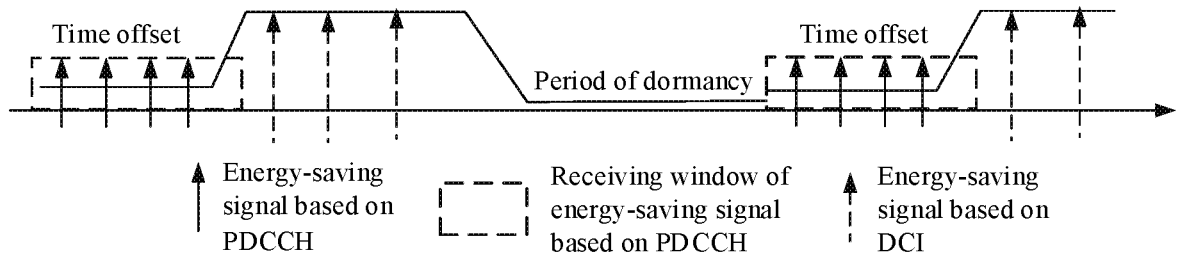
FIG. 3 is a schematic diagram of a relationship between energy saving signal and DRX cycle according to an embodiment of the present disclosure.

There are provided energy saving signal transmission methods, base stations and terminal devices, where a transmission method applied to a base station includes:

configuring an energy saving signal for a terminal device, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1;

sending the energy saving signal to the terminal device.

A transmission method applied to a terminal device includes:

receiving an energy saving signal sent by a base station, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1.

Embodiments will be illustrated below in details in combination with the drawings of the specification and the specific embodiments. Here, in the description of the embodiments of the present application, the terms "first" and "second" hereafter are only for purpose of description, and cannot be construed to indicate or imply the relative importance or implicitly point out the quantity of features indicated. Therefore, the feature defined with "first" or "second" may explicitly or implicitly include one or more features. In the description of the embodiments of the present application, "multiple" means two or more unless otherwise specified.

The terminal device in embodiments of the present disclosure includes a device for providing the voice and/or data connectivity to users, for example, may include a handheld device with the wireless connection function, or a processing device connected to a wireless modem. The terminal device may communicate with the core network via the Radio Access Network (RAN), and exchange the voice and/or data with the RAN. The terminal device may include User Equipment (UE), wireless terminal device, mobile terminal device, subscriber unit, subscriber station, mobile station, mobile, remote station, Access Point (AP), remote terminal, access terminal, user terminal, user agent, or user device, etc. For example, it may include a mobile phone (or called "cellular" phone); a computer with a mobile terminal device; a portable, pocket, handheld, computer built-in or vehicle-carried mobile device; a smart wearable device or the like, for example, Personal Communication Service (PCS) telephone, cordless telephone, Session Initiation Protocol (SIP) telephone, Wireless Local Loop (WLL) station, Personal Digital Assistant (PDA) and other devices. It also includes limited devices, e.g., device with lower power consumption, device with limited storage capability, or device with limited computing capability or the like, e.g., includes bar code, Radio Frequency Identification (RFID) sensor, Global Positioning System (GPS), laser scanner and other information sensing devices.

As an example but not a limitation, the terminal device may also be a wearable device in an embodiment of the present application. The wearable device may also be called wearable smart device, which is a general term of wearable devices developed by using the wearable technology to intelligently design daily wear, such as glasses, gloves, watches, clothing and shoes, etc. The wearable device is a portable device that is directly worn on the body or integrated into the user's cloth or accessory. The wearable device is not only a hardware device, but also realize powerful functions through software support, data interaction and cloud interaction. In a broad sense, the wearable smart device has complete functions, is large in size, and may implement the complete or partial functions without relying on a smart phone, such as a smart watch or smart glasses, etc., and only focuses on a type of application function and needs to be used in cooperation with other devices such as a smart phone, such as various smart bracelets, smart helmets, smart jewelry for physical sign monitoring.

The base station in embodiments of the present disclosure may be an Access Network (AN) device, which specifically refers to a device that communicates with wireless terminal devices through one or more cells at an air interface in the access network, or, for example, a network device in the V2X technology is a Road Side Unit (RSU). The base station may be used to perform the inter-conversion between the received air frame and the Internet Protocol (IP) packet, and used as a router between the terminal device and the rest of the access network, where the rest of the access network may include an IP network. The RSU may be a fixed infrastructure entity that supports a vehicle-to-everything (V2X) application, and may exchange messages with other entities that support the V2X application. The access network device may also coordinate the attribute management of the air interface. For example, the access network device may include an evolutional Node B (NodeB or eNB or e-NodeB) in the Long Term Evolution (LTE) system or Long Term Evolution-Advanced (LTE-A) system, or may include a next generation Node B (gNB) in the 5G New Radio (NR) system, or may include a Centralized Unit (CU) and a Distributed Unit (DU) in the Cloud Radio Access Network (Cloud RAN) system, which is not limited in the embodiments of the present disclosure.

Referring to FIG. 1, a first embodiment of the present disclosure provides an energy saving signal transmission method applied to a base station, including the following steps.

Step S101: configuring an energy saving signal for a terminal device, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1.

Step S102: sending the energy saving signal to the terminal device.

It should be noted that the energy saving signal in this embodiment may also be referred to as energy saving channel, energy saving signal/channel, or energy saving configuration. The energy saving signal carries the energy saving information that may include at least one of: cross-slot scheduling information, information triggering reference signal transmission, Channel State Information (CSI), Bandwidth Partial (BWP)/Secondary cell (Scell) switching information, Multiple Input Multiple Output (MIMO) layer number adjustment/antenna number adjustment information, Control Resource Set (CORESET), search space and candidate location indication information, PDCCH monitoring period information, PDCCH skip indication information, etc. In the 5G NR, the energy saving signal is based on PDCCH. The energy saving signal in this embodiment may be obtained by redefining the information field based on the existing DCI formats that may be DCI format0 series, DCI-foramt1 series and DCI-format2 series defined in the current standard, or the energy saving signal is designed based on new DCI formats that refers to other DCI formats that do not include the above DCI formats, or the energy saving signal is designed based on sequence.

Firstly, the step S101 is executed.

In some embodiments, the energy saving information can indicate the first configuration of at least one DRX cycle to the terminal device. The at least one DRX cycle in this embodiment may be the first cycle and/or the second cycle. For example, there are 5 DRX cycles in total, where the 5 DRX cycles may include 3 first cycles and 2 second cycles, or all the 5 DRX cycles may be first cycles, or all the 5 DRX cycles may be second cycles. The first cycle and the second cycle are long cycles and/or short cycles, that is, when the first cycle is a long cycle, the second cycle is a short cycle; and when the first cycle is a short cycle, the second cycle is a long cycle, where the first cycle and the second cycle are different; or the first cycle is a long cycle and the second cycle is also a long cycle, where the first cycle and the second cycle are different, and the DRX parameters may be different, for example, the cycle parameters of DRX are different, or the ondurationtimer parameters of DRX are different, or the inacitivity timer parameters of DRX are different, or the offset parameters of DRX are different. It should be noted that the long cycle and the short cycle are relative concepts, and it does not mean that the time length of each long cycle is fixed or the time length of each short cycle is fixed. For example, when the time length of a cycle is greater than a preset threshold, this cycle is determined as a long cycle. For example, at least one DRX cycle includes five first cycles, and the first cycle at this time is a long cycle, so the five DRX cycles are all long cycles.

In some embodiments, the first configuration includes at least one of the maximum quantity N of DRX cycles, the maximum quantity K of first cycles, and the quantity Y of first cycles, where all of N, K and Y are integers greater than or equal to 1. Table 1 gives many cases of the first configuration.

| Number | Content of First Configuration |
| --- | --- |
| 1 | The maximum quantity N of DRX cycles |
| 2 | The maximum quantity K of first cycles |
| 3 | The quantity Y of first cycles |
| 4 | The maximum quantity N of DRX cycles and the maximum quantity K of first cycles |
| 5 | The maximum quantity K of first cycles and the quantity Y of first cycles |
| 6 | The maximum quantity N of DRX cycles and the quantity Y of first cycles |
| 7 | The maximum quantity N of DRX cycles, the maximum quantity K of first cycles and the quantity Y of first cycles |

Here, the maximum quantity N of DRX cycles does not limit the quantity of first cycles and second cycles, and the maximum quantity N of DRX cycles is used to indicate that there may be at most N DRX cycles before the terminal device receives a next energy saving signal. Similarly, the maximum quantity K of first cycles only indicates that there may be at most K of first cycles before the terminal device receives the next energy saving signal, and does not limit the quantity of second cycles. The quantity Y of first cycles limits the quantity of first cycles before the terminal device receives the next energy saving signal to Y.

In one embodiment, when the first configuration of the DRX cycle includes the maximum quantity N of DRX cycles, the energy saving information is used to indicate at most N DRX cycles after the energy saving signal sent by the base station to the terminal device this time, where the at most N DRX cycles include at least one first cycle and/or at least one second cycle, a quantity of DRX cycles indicated by the energy saving signal is N1, a quantity of DRX cycles indicated by an energy saving signal sent by the base station to the terminal device last time is N2, N1 and N2 are same or different, N1 is less than or equal to N, and N2 is less than or equal to N.

In some embodiments, the quantities of DRX cycles indicated by a plurality of energy saving signals sent by a base station to a same terminal device may be the same or different. For example, the base station sends two energy saving signals to the terminal device, and the first configurations carried in the two energy saving signals both include the maximum quantity of DRX cycles, where the maximum quantity carried in the first energy saving signal is N1, the maximum quantity carried in the second energy saving signal is N2. N1 may be equal to N2, or N1 may be greater than N2, or N1 may be less than N2.

In one embodiment, when the first configuration of the DRX cycle includes the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, when the first configuration of the DRX cycle includes the maximum quantity K of first cycles, the energy saving information is used to indicate at most K first cycles after the energy saving signal sent by the base station this time; a quantity of DRX cycles indicated by the energy saving signal sent this time is K1, a quantity of DRX cycles indicated by an energy saving signal sent by the base station to the terminal device last time is K2, K1 and K2 are same or different, K1 is less than or equal to K, and K2 is less than or equal to K.

In one embodiment, when the first configuration of the DRX cycle includes the quantity Y of first cycles, the energy saving information is used to indicate a configuration of Y first cycles after the energy saving signal sent by the base station this time.

Taking the Number 6 in Table 1 as an example, the first configuration includes the maximum quantity N of DRX cycles and the quantity Y of first cycles, which means that there may be at most N DRX cycles and Y first cycles after the terminal device receives this energy saving signal. At this time, at most N DRX cycles may include or not include second cycles. When the second cycles are included, the quantity of second cycles is at most N-Y; when no second cycle is included, the quantity of first cycles is fixed to Y.

It should be noted that any two adjacent DRX cycles in at least one DRX cycle are continuous in time or discontinuous in time in an embodiment of the present disclosure. For example, at least one DRX cycle includes 3 DRX cycles, which are cycle 1 to cycle 3, where the cycle 1 and cycle 2 are continuous in time, that is, the ending time of the cycle 1 is closely followed by the starting time of the cycle 2. the cycle 2 and cycle 3 are discontinuous in time, for example, there is a time period of continuous reception between the cycle 2 and cycle 3.

Further, at least one first cycle and/or at least one second cycle is/are included between any two energy saving signals sent by the base station to the terminal device. Any two energy saving signals here are any two of all energy saving signals sent by the base station to the same terminal device. For example, the base station has sent a total of 4 energy saving signals to the terminal device, and at least one first cycle and/or at least one second cycle is/are also included between the first energy saving signal and the fourth energy saving signal. It should be noted that the configuration of at least one DRX cycle between every two energy saving signals may be dynamically changed. Specifically, for example, the configuration of A first cycles is indicated between the first energy saving signal and the second energy saving signal, and the configuration of B first cycles is indicated between the second energy saving signal and the third energy saving signal, where A and B are both integers greater than or equal to 1, and A is not equal to B. The configuration of C first cycles is indicated between the fourth energy saving signal and the sixth energy saving signal, and the configuration of D first cycles is indicated between the sixth energy saving signal and the seventh energy saving signal, where C and D are both integers greater than or equal to 1, and C is not equal to D. The dynamic configuration in this embodiment may be based on a timer or the DRX configuration, and the timer is the physical layer or MAC layer. For example, it is based on physical layer parameters, which include, but are not limited to, the length of time in which the terminal device receives data, the length of time in which the terminal device stops receiving data, or the processing capability of the terminal device.

After the step S101 is executed, the step S102 is executed.

It should be noted that, before performing the step S102, the method in this embodiment further includes: sending a time offset or a maximum time offset corresponding to the energy saving signal to the terminal device, and determining whether to send the energy saving signal.

In some embodiments, the time offset or the maximum time offset corresponding to the energy saving signal may be sent to the terminal device in the following way:

sending a time offset or a maximum time offset corresponding to at least one energy saving signal to the terminal device, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

It should be noted that a fixed time offset semi-statically configured by Radio Resource Control (RRC) is supported in the LTE MTC. In the NR, the DRX configuration of an RRC signaling includes short-cycle (shortDRXcycle) and long-cycle (longDRXcycle) configurations, and a fixed offset cannot match two different DRX cycles at the same time. FIG. 2 shows relationships between shortDRXcycle and offset and between longDRXcycle and offset, where the offset1 matches the service characteristics of longDRXcycle, the offset2 matches the service characteristics of shortDRXcycle, and the value of the offset1 is greater than the value of the offset2. If both shortDRXcycle and longDRXcycle use the offset2, since the offset2 matches the service characteristics of shortDRXcycle, the UE in shortDRXcycle will not be in the deep sleep state and the offset2 leaves the UE with a short wake-up time; when switching to longDRXcycle, the UE needs a long time to wake up because it may be in the deep sleep state in longDRXcycle, and the use of offset2 will cause the UE to fail to wake up successfully, and thus the UE cannot normally receive data sent by the base station. If both shortDRXcycle and longDRXcycle use the offset1, the offset may appear in the activation period (DRX_on) in the shortDRXcycle when switching to shortDRXcycle, that is, the UE will receive the offset when it is in the awake state, and it cannot correctly indicate the arrival of the service and achieve energy saving.

In some embodiments, by configuring different offsets for the long and short DRX cycles, it is possible to better indicate the arrival of the service and to save energy, to achieve the effect of reducing the power consumption of the UE.

The following method may be used to determine whether to send the energy saving signal:

determining whether to send the energy saving signal according to a candidate location of a sending moment of the energy saving signal and information of a first cycle in which the terminal device is currently located, where it is determined to send the energy saving signal when the candidate location of the sending moment includes any one of following cases:

the candidate location of the sending moment is equal to an integer multiple of a time length of the Y first cycles; or the candidate location of the sending moment is equal to an integer multiple of a time length of the maximum N DRX cycles; or the candidate location of the sending moment is equal to an integer multiple of a time length of the maximum K first cycles; or the candidate location of the sending moment is located in a time window equal to an integer multiple of a time length of the Y first cycles; or the candidate location of the sending moment is located in a time window equal to an integer multiple of a time length of the maximum K first cycles; or the candidate location of the sending moment is located in a time window equal to an integer multiple of a time length of the maximum N DRX cycles; or the candidate location of the sending moment is equal to an integer multiple of a time length of the Y first cycles, and the candidate location of the sending moment is located in a time window before an activation period that is an integer multiple of the time length of the Y first cycles; or the candidate location of the sending moment is equal to an integer multiple of a time length of the maximum K first cycles, and the candidate location of the sending moment is located in a time window before an activation period that is an integer multiple of the time length of the maximum K first cycles; or the candidate location of the sending moment is equal to an integer multiple of a time length of the maximum N DRX cycles, and the candidate location of the sending moment is located in a time window before an activation period that is an integer multiple of the time length of the maximum N DRX cycles; or the candidate location of the sending moment is located in an overlapping part of an activation period of at least one first cycle in which the terminal device is currently located with a time window before an activation period of at least one subsequent first cycle and/or second cycle of the terminal device.

Further, it is determined not to send or skip sending the energy saving signal when the candidate location of the sending moment includes any one of following cases:

the candidate location of the sending moment is located at a start moment or an end moment of a first cycle, or in the first cycle; or the candidate location of the sending moment is outside a time window before an activation period of a first cycle; or the candidate location of the sending moment is located in a first cycle, and a next DRX cycle indicated by the energy saving signal this time is a second cycle; or the candidate location of the sending moment is located in an overlapping part of an activation period of a first cycle in which the terminal device is currently located with a time window before an activation period of a next DRX cycle of the terminal device, and the next DRX cycle is a first cycle or second cycle.

Figure 4:
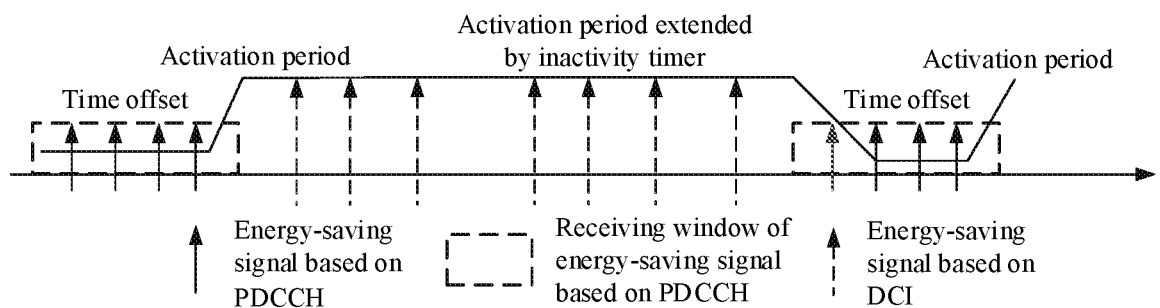
FIG. 4 is a schematic diagram of another relationship between energy saving signal and DRX cycle according to an embodiment of the present disclosure.
Figure 5:
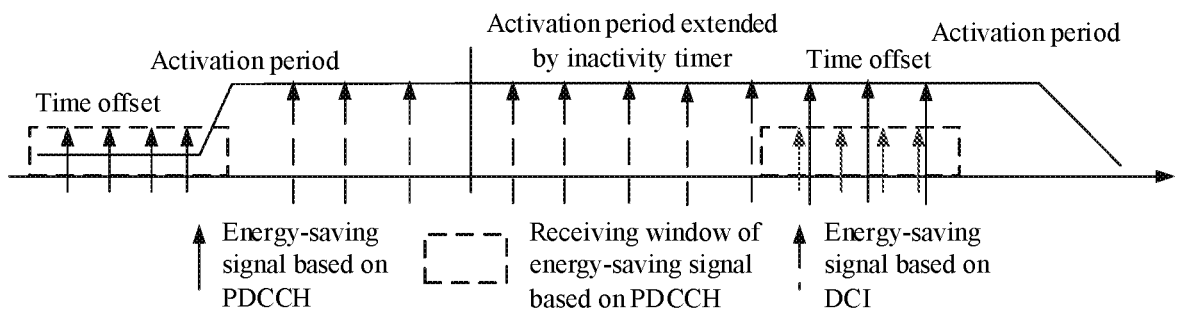
FIG. 5 is a schematic diagram of yet another relationship between energy saving signal and DRX cycle according to an embodiment of the present disclosure.

It should be noted that a DRX cycle includes inside active time (that is, the UE is in the awake state, also called active state) and outside active time (that is, the UE is in the sleep state, also called inactive state). In the prior art, if the UE has not completed the data reception during the inside active time, an inactivity timer may be used to extend the active time of the UE at this time, and the UE can continue to receive data. In the NR, when the UE is in the inactive state, the energy saving signal is a PDCCH-based energy saving signal in a new DCI format, and the UE uses the Packet Service Radio Network Temporary Identifier (PS-RNTI) to detect the energy saving signal in the new DCI format; when the UE is in the active state, the energy saving signal is an energy saving signal in the traditional DCI format used in the LTE, and the UE uses a Radio Network Temporary Identifier (RNTI) to detect the energy saving signal in the traditional DCI format. FIG. 3 shows a schematic diagram in which a UE receives an energy saving signal in the NR. In FIG. 3, the UE receives an energy saving signal in the traditional DCI format in the active state, and the UE receives an energy saving signal in the new DCI format in the inactive state. FIGS. 4 and 5 show the case where a UE receives an energy saving signal when the UE does not complete data reception in the active state and the inactivity timer extends the active time of the UE. Due to the difference in the set duration of the inactivity timer, there is partial overlap (FIG. 4) or complete overlap (FIG. 5) between the case when the UE receives the energy saving signal in the traditional DCI format and the case when the UE normally receives the energy saving signal in the new DCI format during the extended activation time. That is to say, the energy saving signals in two different formats may be sent to the UE at the same time, and the UE cannot determine which method is used to detect and receive the energy saving signals and cannot determine the configuration of the offset.

In some embodiments, different time windows are set to deal with the problem of signal overlap, and the terminal device can accurately detect and receive the energy saving signals and determine the configuration of the offset.

When performing step S102, the following methods may be used:

sending the energy saving signal to the terminal device before an activation moment of the terminal device; or sending the energy saving signal to the terminal device at the activation moment of the terminal device; or sending the energy saving signal to the terminal device when the terminal device is in an activated state.

In one embodiment, the energy saving signal is sent to the terminal device when determining that the candidate location of the sending moment of the energy saving signal is located in any time window as follows;

where the time window includes:
(1) a time window with a first time offset before an activation period of a current DRX cycle as a start point and a start moment of the activation period of the current DRX cycle as an end point, where the current DRX cycle is the first cycle or second cycle; or
(2) a time window with a first time offset before an activation period of the current DRX cycle as a start point and an end moment of the activation period of the current DRX cycle as an end point; or
(3) a time window with a second time offset in the current DRX cycle as a start point and an end moment of the current DRX cycle as an end point;

where the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In some embodiments, for the time window of (1), the length of the time window is the value of the first time offset. At this time, the DRX cycle may be a first cycle or a second cycle, but the first time offset at this time is the same regardless of the first cycle or the second cycle. For example, the first time offset corresponds to a long cycle. Even if the current DRX cycle is a short cycle, the first time offset here still corresponds to a long cycle. For the time window of (2), the length of the time window is equal to the value of the first time offset plus the length of the activation period of the current DRX cycle. For the time window of (3), since the sending moment of the energy saving signal may be within the current DRX cycle, the time window with the second time offset in the current DRX cycle as the start point and the end moment of the current DRX cycle as the end point is set in this case.

A second embodiment of the present disclosure provides an energy saving signal transmission method applied to a terminal device, including:

receiving an energy saving signal sent by a base station, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1.

In one embodiment, when the first configuration of the DRX cycle includes the maximum quantity N of DRX cycles, the energy saving information is used to indicate at most N DRX cycles after the energy saving signal sent by the base station to the terminal device this time, where the at most N DRX cycles include at least one first cycle and/or at least one second cycle, a quantity of DRX cycles indicated by the energy saving signal is N1, a quantity of DRX cycles indicated by an energy saving signal sent by the base station to the terminal device last time is N2, N1 and N2 are same or different, N1 is less than or equal to N, and N2 is less than or equal to N;

when the first configuration of the DRX cycle includes the maximum quantity K of first cycles, the energy saving information is used to indicate at most K first cycles after the energy saving signal sent by the base station this time; a quantity of DRX cycles indicated by the energy saving signal sent this time is K1, a quantity of DRX cycles indicated by an energy saving signal sent by the base station to the terminal device last time is K2, K1 and K2 are same or different, K1 is less than or equal to K, and K2 is less than or equal to K;

when the first configuration of the DRX cycle includes the quantity Y of first cycles, the energy saving information is used to indicate a configuration of Y first cycles after the energy saving signal sent by the base station this time.

In one embodiment, the receiving the energy saving signal sent by the base station, includes:
receiving the energy saving signal before an activation moment of the terminal device; or
receiving the energy saving signal at an activation moment of the terminal device; or
receiving the energy saving signal when the terminal device is in an activated state.

In one embodiment, before receiving the energy saving signal, the method further includes:
determining whether to receive the energy saving signal according to a candidate location for receiving the energy saving signal and information of a first cycle in which the terminal device is currently located, where it is determined to receive the energy saving signal when the candidate location for receiving the energy saving signal includes any one of following cases:
the candidate location for receiving the energy saving signal is equal to an integer multiple of a time length of the Y first cycles; or
the candidate location for receiving the energy saving signal is equal to an integer multiple of a time length of the maximum N DRX cycles; or
the candidate location for receiving the energy saving signal is equal to an integer multiple of a time length of the maximum K first cycles; or
the candidate location for receiving the energy saving signal is located in a time window equal to an integer multiple of a time length of the Y first cycles; or
the candidate location for receiving the energy saving signal is located in a time window equal to an integer multiple of a time length of the maximum K first cycles; or
the candidate location for receiving the energy saving signal is located in a time window equal to an integer multiple of a time length of the maximum N DRX cycles; or
the candidate location for receiving the energy saving signal is equal to an integer multiple of a time length of the Y first cycles, and the candidate location for receiving the energy saving signal is located in a time window before an activation period that is an integer multiple of the time length of the Y first cycles; or
the candidate location for receiving the energy saving signal is equal to an integer multiple of a time length of the maximum K first cycles, and the candidate location for receiving the energy saving signal is located in a time window before an activation period that is an integer multiple of the time length of the maximum K first cycles; or
the candidate location for receiving the energy saving signal is equal to an integer multiple of a time length of the maximum N DRX cycles, and the candidate location for receiving the energy saving signal is located in a time window before an activation period that is an integer multiple of the time length of the maximum N DRX cycles; or the candidate location for receiving the energy saving signal is located in an overlapping part of an activation period of at least one first cycle in which the terminal device is currently located with a time window before an activation period of at least one subsequent first cycle and/or second cycle of the terminal device.

In one embodiment, it is determined not to send or skip sending the energy saving signal when the candidate location for receiving the energy saving signal includes any one of following cases:

the candidate location for receiving the energy saving signal is located at a start moment or an end moment of a first cycle in which the terminal device is currently located, or in the first cycle; or the candidate location for receiving the energy saving signal is located outside a time window before an activation period of a first cycle in which the terminal device is currently located; or the candidate location for receiving the energy saving signal is located in a first cycle, and a next DRX cycle indicated by the energy saving signal is a second cycle; or the candidate location for receiving the energy saving signal is located in an overlapping part of an activation period of a first cycle in which the terminal device is currently located with a time window before an activation period of a next DRX cycle of the terminal device, and the next DRX cycle is a first cycle or second cycle.

In one embodiment, before receiving the energy saving signal, the method further includes:

receiving a time offset or a maximum time offset corresponding to at least one energy saving signal sent by the base station, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the receiving the energy saving signal sent by the base station, includes:

receiving the energy saving signal when determining that the candidate location for receiving the energy saving signal is located in any time window as follows;

where the time window includes:

a time window with a first time offset before an activation period of a current DRX cycle as a start point and a start moment of the activation period of the current DRX cycle as an end point, where the current DRX cycle is the first cycle or second cycle; or a time window with a first time offset before an activation period of the current DRX cycle as a start point and an end moment of the activation period of the current DRX cycle as an end point; or a time window with a second time offset in the current DRX cycle as a start point and an end moment of the current DRX cycle as an end point;

where the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, when the first configuration of the DRX cycle includes the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals received by the terminal device from the base station.

It should be noted that the method in this embodiment is a method on the opposite side of the base station in the foregoing first embodiment, and the specific execution process may refer to the description in the first embodiment, which will not be repeated here.

Figure 6:
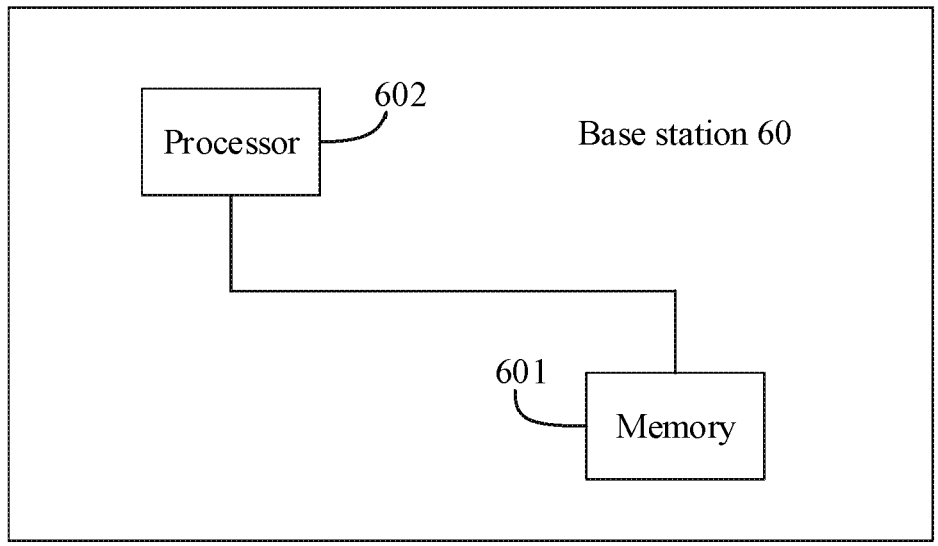
FIG. 6 is a schematic diagram of a physical structure of a base station according to an embodiment of the present disclosure.

Referring to FIG. 6, a third embodiment of the present disclosure provides a base station 60, including:

a memory 601 configured to store instructions;

a processor 602 configured to read the instructions in the memory to perform the process of:

configuring an energy saving signal for a terminal device, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1;

sending the energy saving signal to the terminal device.

In some embodiments, the memory 601 is connected to the processor 602, and the connection mode includes wired connection and wireless connection. The memory 601 stores instructions that can be executed by the processor 602, and the processor 602 performs the steps of the method described in the foregoing method embodiment by executing the instructions stored in the memory 601.

In one embodiment, the processor 602 may include a Central processing unit (CPU) and an Application Specific Integrated Circuit (ASIC), or may be one or more integrated circuits for controlling the program execution, or may be a hardware circuit developed by using a Field Programmable Gate Array (FPGA), or may be a baseband processor.

In one embodiment, the processor 602 may include at least one processing core.

In one embodiment, the memory 601 may include a Read Only Memory (ROM), a Random Access Memory (RAM), and a magnetic disk memory. The memory 601 is further configured to store the data required by the processor 602 when running.

In one embodiment, when the first configuration of the DRX cycle includes the maximum quantity N of DRX cycles, the energy saving information is used to indicate at most N DRX cycles after the energy saving signal sent by the base station to the terminal device this time, where the at most N DRX cycles include at least one first cycle and/or at least one second cycle, a quantity of DRX cycles indicated by the energy saving signal is N1, a quantity of DRX cycles indicated by an energy saving signal sent by the base station to the terminal device last time is N2, N1 and N2 are same or different, N1 is less than or equal to N, and N2 is less than or equal to N;

when the first configuration of the DRX cycle includes the maximum quantity K of first cycles, the energy saving information is used to indicate at most K first cycles after the energy saving signal sent by the base station this time; a quantity of DRX cycles indicated by the energy saving signal sent this time is K1, a quantity of DRX cycles indicated by an energy saving signal sent by the base station to the terminal device last time is K2, K1 and K2 are same or different, K1 is less than or equal to K, and K2 is less than or equal to K;

when the first configuration of the DRX cycle includes the quantity Y of first cycles, the energy saving information is used to indicate a configuration of Y first cycles after the energy saving signal sent by the base station this time.

In one embodiment, the processor is configured to:

send the energy saving signal to the terminal device before an activation moment of the terminal device; or send the energy saving signal to the terminal device at the activation moment of the terminal device; or send the energy saving signal to the terminal device when the terminal device is in an activated state.

In one embodiment, before sending the energy saving signal to the terminal device, the processor is configured to:

determine whether to send the energy saving signal according to a candidate location of a sending moment of the energy saving signal and information of a first cycle in which the terminal device is currently located, where it is determined to send the energy saving signal when the candidate location of the sending moment includes any one of following cases:

the candidate location of the sending moment is equal to an integer multiple of a time length of the Y first cycles; or the candidate location of the sending moment is equal to an integer multiple of a time length of the maximum N DRX cycles; or the candidate location of the sending moment is equal to an integer multiple of a time length of the maximum K first cycles; or the candidate location of the sending moment is located in a time window equal to an integer multiple of a time length of the Y first cycles; or the candidate location of the sending moment is located in a time window equal to an integer multiple of a time length of the maximum K first cycles; or the candidate location of the sending moment is located in a time window equal to an integer multiple of a time length of the maximum N DRX cycles; or the candidate location of the sending moment is equal to an integer multiple of a time length of the Y first cycles, and the candidate location of the sending moment is located in a time window before an activation period that is an integer multiple of the time length of the Y first cycles; or the candidate location of the sending moment is equal to an integer multiple of a time length of the maximum K first cycles, and the candidate location of the sending moment is located in a time window before an activation period that is an integer multiple of the time length of the maximum K first cycles; or the candidate location of the sending moment is equal to an integer multiple of a time length of the maximum N DRX cycles, and the candidate location of the sending moment is located in a time window before an activation period that is an integer multiple of the time length of the maximum N DRX cycles; or the candidate location of the sending moment is located in an overlapping part of an activation period of at least one first cycle in which the terminal device is currently located with a time window before an activation period of at least one subsequent first cycle and/or second cycle of the terminal device.

In one embodiment, it is determined not to send or skip sending the energy saving signal when the candidate location of the sending moment includes any one of following cases:

the candidate location of the sending moment is located at a start moment or an end moment of a first cycle, or in the first cycle; or the candidate location of the sending moment is outside a time window before an activation period of a first cycle; or the candidate location of the sending moment is located in a first cycle, and a next DRX cycle indicated by the energy saving signal this time is a second cycle; or the candidate location of the sending moment is located in an overlapping part of an activation period of a first cycle in which the terminal device is currently located with a time window before an activation period of a next DRX cycle of the terminal device, and the next DRX cycle is a first cycle or second cycle.

In one embodiment, before sending the energy saving signal to the terminal device, the processor is configured to:

send a time offset or a maximum time offset corresponding to at least one energy saving signal to the terminal device, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the processor is configured to:

send the energy saving signal to the terminal device when determining that a sending moment of the energy saving signal is located in a preset time window;

where the preset time window includes:

a time window with a first time offset before an activation period of a current DRX cycle as a start point and a start moment of the activation period of the current DRX cycle as an end point, where the current DRX cycle is the first cycle or second cycle; or a time window with a first time offset before an activation period of the current DRX cycle as a start point and an end moment of the activation period of the current DRX cycle as an end point; or a time window with a second time offset in the current DRX cycle as a start point and an end moment of the current DRX cycle as an end point;

where the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, when the first configuration of the DRX cycle includes the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals sent by the base station to the terminal device.

Figure 7:
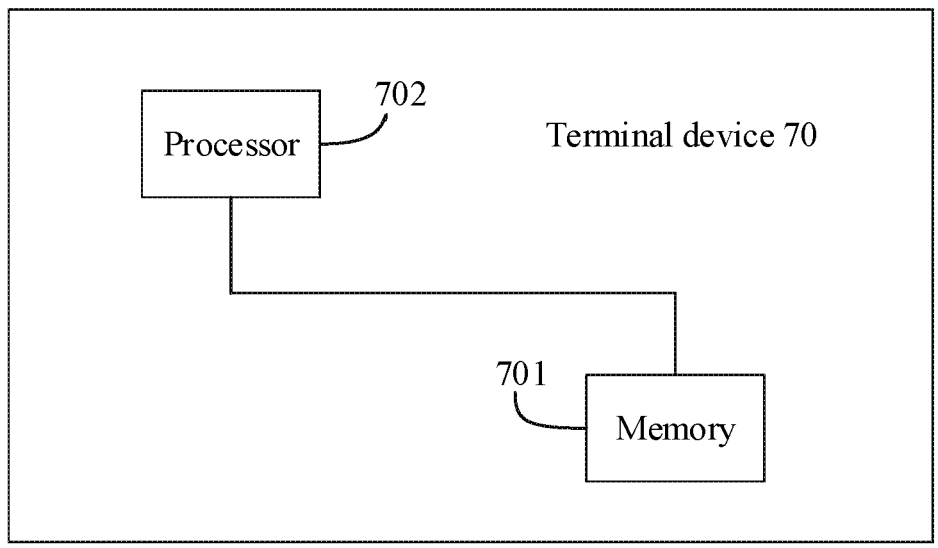
FIG. 7 is a schematic diagram of a physical structure of a terminal device according to an embodiment of the present disclosure.

Referring to FIG. 7, a fourth embodiment of the present disclosure provides a terminal device 70, including:

a memory 701 configured to store instructions;

a processor 702 configured to read the instructions in the memory to perform the process of:

receiving an energy saving signal sent by a base station, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1.

In some embodiments, the memory 701 is connected to the processor 702, and the connection mode includes wired connection and wireless connection. The memory 701 stores instructions that can be executed by the processor 702, and the processor 702 performs the steps of the method described in the foregoing method embodiment by executing the instructions stored in the memory 701.

In one embodiment, the processor 702 may include a Central processing unit (CPU) and an Application Specific Integrated Circuit (ASIC), or may be one or more integrated circuits for controlling the program execution, or may be a hardware circuit developed by using a Field Programmable Gate Array (FPGA), or may be a baseband processor.

In one embodiment, the processor 702 may include at least one processing core.

In one embodiment, the memory 701 may include a Read Only Memory (ROM), a Random Access Memory (RAM), and a magnetic disk memory. The memory 701 is further configured to store the data required by the processor 702 when running.

In one embodiment, when the first configuration of the DRX cycle includes the maximum quantity N of DRX cycles, the energy saving information is used to indicate at most N DRX cycles after the energy saving signal sent by the base station to the terminal device this time, where the at most N DRX cycles include at least one first cycle and/or at least one second cycle, a quantity of DRX cycles indicated by the energy saving signal is N1, a quantity of DRX cycles indicated by an energy saving signal sent by the base station to the terminal device last time is N2, N1 and N2 are same or different, N1 is less than or equal to N, and N2 is less than or equal to N;

when the first configuration of the DRX cycle includes the maximum quantity K of first cycles, the energy saving information is used to indicate at most K first cycles after the energy saving signal sent by the base station this time; a quantity of DRX cycles indicated by the energy saving signal sent this time is K1, a quantity of DRX cycles indicated by an energy saving signal sent by the base station to the terminal device last time is K2, K1 and K2 are same or different, K1 is less than or equal to K, and K2 is less than or equal to K;

when the first configuration of the DRX cycle includes the quantity Y of first cycles, the energy saving information is used to indicate a configuration of Y first cycles after the energy saving signal sent by the base station this time.

In one embodiment, the receiving the energy saving signal sent by the base station, includes:

receiving the energy saving signal before an activation moment of the terminal device; or receiving the energy saving signal at an activation moment of the terminal device; or receiving the energy saving signal when the terminal device is in an activated state.

In one embodiment, before receiving the energy saving signal, the processor is configured to:

determine whether to receive the energy saving signal according to a candidate location for receiving the energy saving signal and information of a first cycle in which the terminal device is currently located, where it is determined to receive the energy saving signal when the candidate location for receiving the energy saving signal includes any one of following cases:

the candidate location for receiving the energy saving signal is equal to an integer multiple of a time length of the Y first cycles; or the candidate location for receiving the energy saving signal is equal to an integer multiple of a time length of the maximum N DRX cycles; or the candidate location for receiving the energy saving signal is equal to an integer multiple of a time length of the maximum K first cycles; or the candidate location for receiving the energy saving signal is located in a time window equal to an integer multiple of a time length of the Y first cycles; or the candidate location for receiving the energy saving signal is located in a time window equal to an integer multiple of a time length of the maximum K first cycles; or the candidate location for receiving the energy saving signal is located in a time window equal to an integer multiple of a time length of the maximum N DRX cycles; or the candidate location for receiving the energy saving signal is equal to an integer multiple of a time length of the Y first cycles, and the candidate location for receiving the energy saving signal is located in a time window before an activation period that is an integer multiple of the time length of the Y first cycles; or the candidate location for receiving the energy saving signal is equal to an integer multiple of a time length of the maximum K first cycles, and the candidate location for receiving the energy saving signal is located in a time window before an activation period that is an integer multiple of the time length of the maximum K first cycles; or the candidate location for receiving the energy saving signal is equal to an integer multiple of a time length of the maximum N DRX cycles, and the candidate location for receiving the energy saving signal is located in a time window before an activation period that is an integer multiple of the time length of the maximum N DRX cycles; or the candidate location for receiving the energy saving signal is located in an overlapping part of an activation period of at least one first cycle in which the terminal device is currently located with a time window before an activation period of at least one subsequent first cycle and/or second cycle of the terminal device.

In one embodiment, it is determined not to send or skip sending the energy saving signal when the candidate location for receiving the energy saving signal includes any one of following cases:

the candidate location for receiving the energy saving signal is located at a start moment or an end moment of a first cycle in which the terminal device is currently located, or in the first cycle; or the candidate location for receiving the energy saving signal is located outside a time window before an activation period of a first cycle in which the terminal device is currently located; or the candidate location for receiving the energy saving signal is located in a first cycle, and a next DRX cycle indicated by the energy saving signal is a second cycle; or the candidate location for receiving the energy saving signal is located in an overlapping part of an activation period of a first cycle in which the terminal device is currently located with a time window before an activation period of a next DRX cycle of the terminal device, and the next DRX cycle is a first cycle or second cycle.

In one embodiment, before receiving the energy saving signal, the processor is configured to:

receive a time offset or a maximum time offset corresponding to at least one energy saving signal sent by the base station, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the processor is configured to:

receive the energy saving signal when determining that the candidate location for receiving the energy saving signal is located in any time window as follows;

where the time window includes:

a time window with a first time offset before an activation period of a current DRX cycle as a start point and a start moment of the activation period of the current DRX cycle as an end point, where the current DRX cycle is the first cycle or second cycle; or a time window with a first time offset before an activation period of the current DRX cycle as a start point and an end moment of the activation period of the current DRX cycle as an end point; or a time window with a second time offset in the current DRX cycle as a start point and an end moment of the current DRX cycle as an end point;

where the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, when the first configuration of the DRX cycle includes the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals received by the terminal device from the base station.

Figure 8:
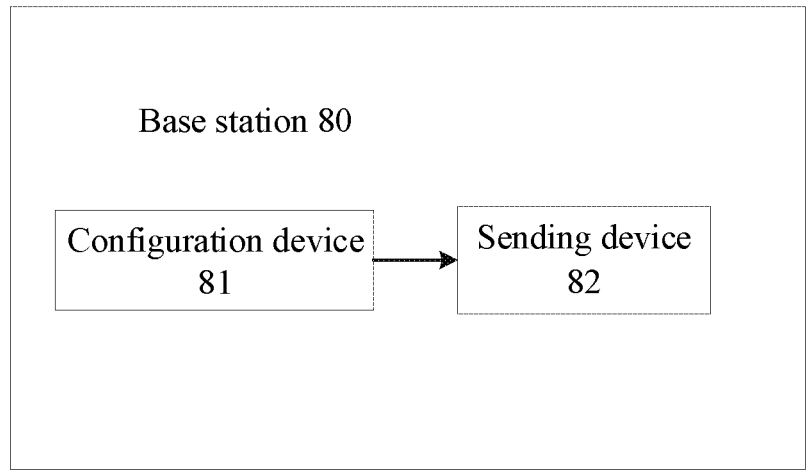
FIG. 8 is a structural schematic diagram of a base station according to an embodiment of the present disclosure.

As shown in FIG. 8, a fifth embodiment of the present disclosure provides a base station 80, including:

a configuration device 81 configured to configure an energy saving signal for a terminal device, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1;

a sending device 82 configured to send the energy saving signal to the terminal device.

In one embodiment, when the first configuration of the DRX cycle includes the maximum quantity N of DRX cycles, the energy saving information is used to indicate at most N DRX cycles after the energy saving signal sent by the base station to the terminal device this time, where the at most N DRX cycles include at least one first cycle and/or at least one second cycle, a quantity of DRX cycles indicated by the energy saving signal is N1, a quantity of DRX cycles indicated by an energy saving signal sent by the base station to the terminal device last time is N2, N1 and N2 are same or different, N1 is less than or equal to N, and N2 is less than or equal to N;

when the first configuration of the DRX cycle includes the maximum quantity K of first cycles, the energy saving information is used to indicate at most K first cycles after the energy saving signal sent by the base station this time; a quantity of DRX cycles indicated by the energy saving signal sent this time is K1, a quantity of DRX cycles indicated by an energy saving signal sent by the base station to the terminal device last time is K2, K1 and K2 are same or different, K1 is less than or equal to K, and K2 is less than or equal to K;

when the first configuration of the DRX cycle includes the quantity Y of first cycles, the energy saving information is used to indicate a configuration of Y first cycles after the energy saving signal sent by the base station this time.

In one embodiment, the sending the energy saving signal to the terminal device, includes:

sending the energy saving signal to the terminal device before an activation moment of the terminal device; or sending the energy saving signal to the terminal device at the activation moment of the terminal device; or sending the energy saving signal to the terminal device when the terminal device is in an activated state.

In one embodiment, the base station further includes:

a determining device configured to determine whether to send the energy saving signal according to a candidate location of a sending moment of the energy saving signal and information of a first cycle in which the terminal device is currently located before sending the energy saving signal to the terminal device, where it is determined to send the energy saving signal when the candidate location of the sending moment includes any one of following cases:

the candidate location of the sending moment is equal to an integer multiple of a time length of the Y first cycles; or the candidate location of the sending moment is equal to an integer multiple of a time length of the maximum N DRX cycles; or the candidate location of the sending moment is equal to an integer multiple of a time length of the maximum K first cycles; or the candidate location of the sending moment is located in a time window equal to an integer multiple of a time length of the Y first cycles; or the candidate location of the sending moment is located in a time window equal to an integer multiple of a time length of the maximum K first cycles; or the candidate location of the sending moment is located in a time window equal to an integer multiple of a time length of the maximum N DRX cycles; or the candidate location of the sending moment is equal to an integer multiple of a time length of the Y first cycles, and the candidate location of the sending moment is located in a time window before an activation period that is an integer multiple of the time length of the Y first cycles; or the candidate location of the sending moment is equal to an integer multiple of a time length of the maximum K first cycles, and the candidate location of the sending moment is located in a time window before an activation period that is an integer multiple of the time length of the maximum K first cycles; or the candidate location of the sending moment is equal to an integer multiple of a time length of the maximum N DRX cycles, and the candidate location of the sending moment is located in a time window before an activation period that is an integer multiple of the time length of the maximum N DRX cycles; or the candidate location of the sending moment is located in an overlapping part of an activation period of at least one first cycle in which the terminal device is currently located with a time window before an activation period of at least one subsequent first cycle and/or second cycle of the terminal device.

In one embodiment, it is determined not to send or skip sending the energy saving signal when the candidate location of the sending moment includes any one of following cases:

the candidate location of the sending moment is located at a start moment or an end moment of a first cycle, or in the first cycle; or the candidate location of the sending moment is outside a time window before an activation period of a first cycle; or the candidate location of the sending moment is located in a first cycle, and a next DRX cycle indicated by the energy saving signal this time is a second cycle; or the candidate location of the sending moment is located in an overlapping part of an activation period of a first cycle in which the terminal device is currently located with a time window before an activation period of a next DRX cycle of the terminal device, and the next DRX cycle is a first cycle or second cycle.

In one embodiment, the configuration device is further configured to:

send a time offset or a maximum time offset corresponding to at least one energy saving signal to the terminal device before sending the energy saving signal to the terminal device, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the sending device is configured to:
send the energy saving signal to the terminal device when determining that the candidate location of the sending moment of the energy saving signal is located in any time window as follows;

where the time window includes:
a time window with a first time offset before an activation period of a current DRX cycle as a start point and a start moment of the activation period of the current DRX cycle as an end point, where the current DRX cycle is the first cycle or second cycle; or a time window with a first time offset before an activation period of the current DRX cycle as a start point and an end moment of the activation period of the current DRX cycle as an end point; or a time window with a second time offset in the current DRX cycle as a start point and an end moment of the current DRX cycle as an end point;

where the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, when the first configuration of the DRX cycle includes the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals sent by the base station to the terminal device.

Figure 9:
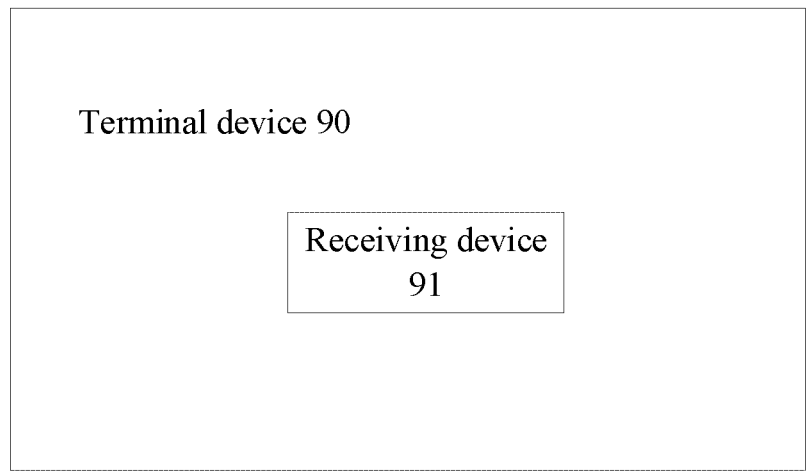
FIG. 9 is a structural schematic diagram of a terminal device according to an embodiment of the present disclosure.

Referring to FIG. 9, a sixth embodiment of the present disclosure provides a terminal device 90, including:

a receiving device 91 configured to receive an energy saving signal sent by a base station, where the energy saving signal carries energy saving information used to indicate a first configuration of at least one DRX cycle to the terminal device, the at least one DRX cycle includes at least one first cycle and/or at least one second cycle, where the first cycle and the second cycle are long cycles and/or short cycles, and the first cycle is different from the second cycle; the first configuration of the DRX cycle includes at least one of a maximum quantity N of DRX cycles, a maximum quantity K of first cycles or a quantity Y of first cycles, where all of N, K and Y are integers greater than or equal to 1.

In one embodiment, when the first configuration of the DRX cycle includes the maximum quantity N of DRX cycles, the energy saving information is used to indicate at most N DRX cycles after the energy saving signal sent by the base station to the terminal device this time, where the at most N DRX cycles include at least one first cycle and/or at least one second cycle, a quantity of DRX cycles indicated by the energy saving signal is N1, a quantity of DRX cycles indicated by an energy saving signal sent by the base station to the terminal device last time is N2, N1 and N2 are same or different, N1 is less than or equal to N, and N2 is less than or equal to N;

when the first configuration of the DRX cycle includes the maximum quantity K of first cycles, the energy saving information is used to indicate at most K first cycles after the energy saving signal sent by the base station this time; a quantity of DRX cycles indicated by the energy saving signal sent this time is K1, a quantity of DRX cycles indicated by an energy saving signal sent by the base station to the terminal device last time is K2, K1 and K2 are same or different, K1 is less than or equal to K, and K2 is less than or equal to K;

when the first configuration of the DRX cycle includes the quantity Y of first cycles, the energy saving information is used to indicate a configuration of Y first cycles after the energy saving signal sent by the base station this time.

In one embodiment, the receiving device is further configured to:

receive the energy saving signal before an activation moment of the terminal device; or receive the energy saving signal at an activation moment of the terminal device; or receive the energy saving signal when the terminal device is in an activated state.

In one embodiment, the terminal device further includes:

a determining device configured to determine whether to receive the energy saving signal according to a candidate location for receiving the energy saving signal and information of a first cycle in which the terminal device is currently located before receiving the energy saving signal, where it is determined to receive the energy saving signal when the candidate location for receiving the energy saving signal includes any one of following cases:

the candidate location for receiving the energy saving signal is equal to an integer multiple of a time length of the Y first cycles; or the candidate location for receiving the energy saving signal is equal to an integer multiple of a time length of the maximum N DRX cycles; or the candidate location for receiving the energy saving signal is equal to an integer multiple of a time length of the maximum K first cycles; or the candidate location for receiving the energy saving signal is located in a time window equal to an integer multiple of a time length of the Y first cycles; or the candidate location for receiving the energy saving signal is located in a time window equal to an integer multiple of a time length of the maximum K first cycles; or the candidate location for receiving the energy saving signal is located in a time window equal to an integer multiple of a time length of the maximum N DRX cycles; or the candidate location for receiving the energy saving signal is equal to an integer multiple of a time length of the Y first cycles, and the candidate location for receiving the energy saving signal is located in a time window before an activation period that is an integer multiple of the time length of the Y first cycles; or the candidate location for receiving the energy saving signal is equal to an integer multiple of a time length of the maximum K first cycles, and the candidate location for receiving the energy saving signal is located in a time window before an activation period that is an integer multiple of the time length of the maximum K first cycles; or the candidate location for receiving the energy saving signal is equal to an integer multiple of a time length of the maximum N DRX cycles, and the candidate location for receiving the energy saving signal is located in a time window before an activation period that is an integer multiple of the time length of the maximum N DRX cycles; or the candidate location for receiving the energy saving signal is located in an overlapping part of an activation period of at least one first cycle in which the terminal device is currently located with a time window before an activation period of at least one subsequent first cycle and/or second cycle of the terminal device.

In one embodiment, it is determined not to send or skip sending the energy saving signal when the candidate location for receiving the energy saving signal includes any one of following cases:

the candidate location for receiving the energy saving signal is located at a start moment or an end moment of a first cycle in which the terminal device is currently located, or in the first cycle; or the candidate location for receiving the energy saving signal is located outside a time window before an activation period of a first cycle in which the terminal device is currently located; or the candidate location for receiving the energy saving signal is located in a first cycle, and a next DRX cycle indicated by the energy saving signal is a second cycle; or the candidate location for receiving the energy saving signal is located in an overlapping part of an activation period of a first cycle in which the terminal device is currently located with a time window before an activation period of a next DRX cycle of the terminal device, and the next DRX cycle is a first cycle or second cycle.

In one embodiment, the receiving device is further configured to:

receive a time offset or a maximum time offset corresponding to at least one energy saving signal sent by the base station before receiving the energy saving signal, where the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, the time offset and the maximum time offset are configured by high-layer signaling, and the high-layer signaling includes RRC signaling or MAC-CE signaling.

In one embodiment, the receiving device is configured to:

receive the energy saving signal when determining that the candidate location for receiving the energy saving signal is located in any time window as follows;

where the time window includes:

a time window with a first time offset before an activation period of a current DRX cycle as a start point and a start moment of the activation period of the current DRX cycle as an end point, where the current DRX cycle is the first cycle or second cycle; or a time window with a first time offset before an activation period of the current DRX cycle as a start point and an end moment of the activation period of the current DRX cycle as an end point; or a time window with a second time offset in the current DRX cycle as a start point and an end moment of the current DRX cycle as an end point;

where the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

In one embodiment, any two adjacent DRX cycles in the at least one DRX cycle are continuous in time or discontinuous in time.

In one embodiment, when the first configuration of the DRX cycle includes the maximum quantity N of the at least one DRX cycle, the first configuration of the DRX cycle further includes:

a maximum quantity M1 of first cycles and a maximum quantity M2 of second cycles, where M1 and M2 are both integers greater than or equal to 0, and M1+M2=N.

In one embodiment, at least one first cycle and/or at least one second cycle is/are included between any two energy saving signals received by the terminal device from the base station.

A seventh embodiment of the present disclosure provides a computer readable storage medium, including:

the computer readable storage medium stores computer instructions thereon, and the computer instructions, when executed by a processor, implement the steps of the method as described in the first embodiment.

An eighth embodiment of the present disclosure provides a computer readable storage medium, including:

the computer readable storage medium stores computer instructions thereon, and the computer instructions, when executed by a processor, implement the steps of the method as described in the second embodiment.

The embodiments of the present disclosure has at least the following advantages.

In embodiments of the present disclosure, the base station may configure an energy saving signal for the terminal device, where the energy saving signal carries the energy saving information that can indicate the first configuration of at least one DRX cycle to the terminal device, the at least one DRX cycle includes at least one first cycle and/or at least one second cycle, the first cycle and the second cycle are long cycles and/or short cycles, and the first cycle is different from the second cycle; the first configuration of the DRX cycle includes at least one of the maximum quantity N of DRX cycles, the maximum quantity K of first cycles and the quantity Y of first cycles, where N, K and Y are all integers greater than or equal to 1, and the energy saving signal can indicate to the terminal device for any combination of DRX cycles with different lengths, to solve the problem of how to configure the quantity of DRX cycles indicated by the energy saving signal in prior art, and achieve the effects of improving the energy saving effect, reducing the transmission delay and improving the performance of the terminal device.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. An energy saving signal transmission method, applied to a base station, and the method comprises:
    configuring an energy saving signal for a terminal device, wherein the energy saving signal carries energy saving information used to indicate a first configuration of at least one Discontinuous Reception, DRX, cycle to the terminal device, the at least one DRX cycle comprises at least one first cycle and/or at least one second cycle, wherein the first cycle and the second cycle are long cycles and/or short cycles, and the first cycle is different from the second cycle; the first configuration of the DRX cycle comprises at least one of a maximum quantity N of DRX cycles, a maximum quantity K of first cycles or a quantity Y of first cycles, wherein all of N, K and Y are integers greater than or equal to 1;
    sending the energy saving signal to the terminal device;
    wherein in response to the first configuration of the DRX cycle comprising the maximum quantity N of DRX cycles, the energy saving information is used to indicate at most N DRX cycles after the energy saving signal currently sent by the base station to the terminal device, wherein the at most N DRX cycles comprise at least one first cycle and/or at least one second cycle, a quantity of DRX cycles indicated by the energy saving signal is N1, a quantity of DRX cycles indicated by an energy saving signal previously sent by the base station to the terminal device is N2, N1 and N2 are same with each other or different from each other, N1 is less than or equal to N, and N2 is less than or equal to N;
    in response to the first configuration of the DRX cycle comprising the maximum quantity K of first cycles, the energy saving information is used to indicate at most K first cycles after the energy saving signal currently sent by the base station this time; a quantity of DRX cycles indicated by the energy saving signal currently sent is K1, a quantity of DRX cycles indicated by an energy saving signal previously by the base station to the terminal device is K2, K1 and K2are same with each other or different from each other, K1 is less than or equal to K, and K2 is less than or equal to K;
    in response to the first configuration of the DRX cycle comprising the quantity Y of first cycles, the energy saving information is used to indicate a configuration of Y first cycles after the energy saving signal currently sent by the base station.

2. The method of claim 1, wherein the sending the energy saving signal to the terminal device, comprises:
    sending the energy saving signal to the terminal device before an activation moment of the terminal device; or
    sending the energy saving signal to the terminal device at the activation moment of the terminal device; or sending the energy saving signal to the terminal device in response to the terminal device being in an activated state.

3. The method of claim 1, wherein before sending the energy saving signal to the terminal device, the method further comprises:
determining whether to send the energy saving signal according to a candidate location of a sending moment of the energy saving signal and information of a first cycle in which the terminal device is currently located, wherein it is determined to send the energy saving signal in response to the candidate location of the sending moment comprising any one of following cases:
the candidate location of the sending moment is equal to an integer multiple of a time length of the Y first cycles; or
the candidate location of the sending moment is equal to an integer multiple of a time length of the maximum N DRX cycles; or
the candidate location of the sending moment is equal to an integer multiple of a time length of the maximum K first cycles; or
the candidate location of the sending moment is located in a time window of an integer multiple of a time length of the Y first cycles; or
the candidate location of the sending moment is located in a time window of an integer multiple of a time length of the maximum K first cycles; or
the candidate location of the sending moment is located in a time window of an integer multiple of a time length of the maximum N DRX cycles; or
the candidate location of the sending moment is equal to an integer multiple of a time length of the Y first cycles, and the candidate location of the sending moment is located in a time window before an activation period of an integer multiple of the time length of the Y first cycles; or
the candidate location of the sending moment is equal to an integer multiple of a time length of the maximum K first cycles, and the candidate location of the sending moment is located in a time window before an activation period of an integer multiple of the time length of the maximum K first cycles; or
the candidate location of the sending moment is equal to an integer multiple of a time length of the maximum N DRX cycles, and the candidate location of the sending moment is located in a time window before an activation period of an integer multiple of the time length of the maximum N DRX cycles; or
the candidate location of the sending moment is located in an overlapping part of an activation period of at least one first cycle in which the terminal device is currently located, and a time window before an activation period of at least one subsequent first cycle and/or second cycle of the terminal device;
wherein before sending the energy saving signal to the terminal device, the method further comprises:
sending a time offset or a maximum time offset corresponding to at least one energy saving signal to the terminal device, wherein the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, or the time offset and the maximum time offset are configured by high-layer signaling, and the high-layer signaling comprises a RRC signaling or a MAC-CE signaling.

4. The method of claim 3, wherein it is determined not to send or skip sending the energy saving signal in response to the candidate location of the sending moment comprising any one of following cases:
the candidate location of the sending moment is located at a start moment or an end moment of a first cycle, or in the first cycle; or
the candidate location of the sending moment is outside a time window before an activation period of a first cycle; or
the candidate location of the sending moment is located in a first cycle, and a next DRX cycle indicated by the energy saving signal is a second cycle; or
the candidate location of the sending moment is located in an overlapping part of an activation period of a first cycle in which the terminal device is currently located, and a time window before an activation period of a next DRX cycle of the terminal device, and the next DRX cycle is a first cycle or second cycle.

5. The method of claim 3, wherein the sending the energy saving signal to the terminal device, comprises:
sending the energy saving signal to the terminal device in response to determining that the candidate location of the sending moment of the energy saving signal is located in any time window as follows;
wherein the time window comprises:
a time window of a start point and an end point, the start point is a first time offset before an activation period of a current DRX cycle, and the end point is a start moment of the activation period of the current DRX cycle, wherein the current DRX cycle is the first cycle or second cycle; or
a time window of a start point and an end point, the start part is a first time offset before an activation period of the current DRX cycle, and the end point is an end moment of the activation period of the current DRX cycle; or
a time window of a start point and an end point, the start point is a second time offset in the current DRX cycle, and the end point is an end moment of the current DRX cycle;
wherein the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

6. The method of claim 1, wherein any two adjacent DRX cycles in the at least one DRX cycle are continuous in time or discontinuous in time.

7. The method of claim 1, wherein in response to the first configuration of the DRX cycle comprising the maximum quantity N of the at least one DRX cycle, the first configuration of the DRX cycle further comprises:
a maximum quantity M1 of first cycles and a maximum quantity M2 of second cycles, wherein M1 and M2 are both integers greater than or equal to 0, and M1+M2=N.

8. The method of claim 1, wherein at least one first cycle and/or at least one second cycle is/are comprised between any two energy saving signals sent by the base station to the terminal device.

9. An energy saving signal transmission method, applied to a terminal device, and the method comprises:

receiving an energy saving signal sent by a base station, wherein the energy saving signal carries energy saving information used to indicate a first configuration of at least one Discontinuous Reception, DRX, cycle to the terminal device, the at least one DRX cycle comprises at least one first cycle and/or at least one second cycle, wherein the first cycle and the second cycle are long cycles and/or short cycles, and the first cycle is different from the second cycle; the first configuration of the DRX cycle comprises at least one of a maximum quantity N of DRX cycles, a maximum quantity K of first cycles or a quantity Y of first cycles, wherein all of N, K and Y are integers greater than or equal to 1;

wherein in response to the first configuration of the DRX cycle comprising the maximum quantity N of DRX cycles, the energy saving information is used to indicate at most N DRX cycles after the energy saving signal sent currently by the base station to the terminal device, wherein the at most N DRX cycles comprise at least one first cycle and/or at least one second cycle, a quantity of DRX cycles indicated by the energy saving signal is N1, a quantity of DRX cycles indicated by an energy saving signal previously sent by the base station to the terminal device is N2, N1 and N2 are same with each other or different from each other, N1 is less than or equal to N, and N2 is less than or equal to N;

in response to the first configuration of the DRX cycle comprising the maximum quantity K of first cycles, the energy saving information is used to indicate at most K first cycles after the energy saving signal currently sent by the base station; a quantity of DRX cycles indicated by the energy saving signal currently sent is K1, a quantity of DRX cycles indicated by an energy saving signal previously sent by the base station to the terminal device is K2, K1 and K2 are same with each other or different from each other, K1 is less than or equal to K, and K2 is less than or equal to K;

in response to the first configuration of the DRX cycle comprising the quantity Y of first cycles, the energy saving information is used to indicate a configuration of Y first cycles after the energy saving signal currently sent by the base station.

10. The method of claim 9, wherein the receiving the energy saving signal sent by the base station, comprises:
receiving the energy saving signal before an activation moment of the terminal device; or
receiving the energy saving signal at an activation moment of the terminal device; or
receiving the energy saving signal in response to the terminal device being in an activated state.

11. The method of claim 9, wherein before receiving the energy saving signal, the method further comprises:
determining whether to receive the energy saving signal according to a candidate location for receiving the energy saving signal and information of a first cycle in which the terminal device is currently located, wherein it is determined to receive the energy saving signal in response to the candidate location for receiving the energy saving signal comprising any one of following cases:
the candidate location for receiving the energy saving signal is equal to an integer multiple of a time length of the Y first cycles; or
the candidate location for receiving the energy saving signal is equal to an integer multiple of a time length of the maximum N DRX cycles; or
the candidate location for receiving the energy saving signal is equal to an integer multiple of a time length of the maximum K first cycles; or
the candidate location for receiving the energy saving signal is located in a time window being an integer multiple of a time length of the Y first cycles; or
the candidate location for receiving the energy saving signal is located in a time window being an integer multiple of a time length of the maximum K first cycles; or
the candidate location for receiving the energy saving signal is located in a time window being an integer multiple of a time length of the maximum N DRX cycles; or
the candidate location for receiving the energy saving signal is equal to an integer multiple of a time length of the Y first cycles, and the candidate location for receiving the energy saving signal is located in a time window before an activation period being an integer multiple of the time length of the Y first cycles; or
the candidate location for receiving the energy saving signal is equal to an integer multiple of a time length of the maximum K first cycles, and the candidate location for receiving the energy saving signal is located in a time window before an activation period being an integer multiple of the time length of the maximum K first cycles; or
the candidate location for receiving the energy saving signal is equal to an integer multiple of a time length of the maximum N DRX cycles, and the candidate location for receiving the energy saving signal is located in a time window before an activation period being an integer multiple of the time length of the maximum N DRX cycles; or
the candidate location for receiving the energy saving signal is located in an overlapping part of an activation period of at least one first cycle in which the terminal device is currently located, and a time window before an activation period of at least one subsequent first cycle and/or second cycle of the terminal device;
wherein before receiving the energy saving signal, the method further comprises:
receiving a time offset or a maximum time offset corresponding to at least one energy saving signal sent by the base station, wherein the time offset and the maximum time offset are pre-configured by the base station for the terminal device, the time offset and the maximum time offset are both integers greater than or equal to 0, the time offset and the maximum time offset are statically configured, semi-statically configured, dynamically configured or pre-defined, or the time offset and the maximum time offset are configured by high-layer signaling, and the high-layer signaling comprises a RRC signaling or a MAC-CE signaling.

12. The method of claim 11, wherein it is determined not to send or skip sending the energy saving signal in response to the candidate location for receiving the energy saving signal comprising any one of following cases:
the candidate location for receiving the energy saving signal is located at a start moment or an end moment of a first cycle in which the terminal device is currently located, or in the first cycle; or
the candidate location for receiving the energy saving signal is located outside a time window before an activation period of a first cycle in which the terminal device is currently located; or the candidate location for receiving the energy saving signal is located in a first cycle, and a next DRX cycle indicated by the energy saving signal is a second cycle; or the candidate location for receiving the energy saving signal is located in an overlapping part of an activation period of a first cycle in which the terminal device is currently located, and a time window before an activation period of a next DRX cycle of the terminal device, and the next DRX cycle is a first cycle or second cycle.

13. The method of claim 11, wherein the receiving the energy saving signal sent by the base station, comprises:
receiving the energy saving signal in response to determining that the candidate location for receiving the energy saving signal being located in any time window as follows;
wherein the time window comprises:
a time window of a start point and an end point, the start point is a first time offset before an activation period of a current DRX cycle, and the end point is a start moment of the activation period of the current DRX cycle, wherein the current DRX cycle is the first cycle or second cycle; or
a time window of a start point and an end point, the start point is a first time offset before an activation period of the current DRX cycle, the end point is an end moment of the activation period of the current DRX cycle; or
a time window of a start point and an end point, the start point is a second time offset in the current DRX cycle as a start point and an end moment of the current DRX cycle as an end point;
wherein the first time offset is used to indicate a sending location of an energy saving signal in the current DRX cycle, the second time offset is used to indicate a sending location of an energy saving signal in a DRX cycle after the current DRX cycle, the current DRX cycle is the first cycle or the second cycle.

14. The method of claim 9, wherein any two adjacent DRX cycles in the at least one DRX cycle are continuous in time or discontinuous in time.

15. The method of claim 9, wherein in response to the first configuration of the DRX cycle comprising the maximum quantity N of the at least one DRX cycle, the first configuration of the DRX cycle further comprises:
a maximum quantity M1 of first cycles and a maximum quantity M2 of second cycles, wherein M1 and M2 are both integers greater than or equal to 0, and M1+M2=N.

16. The method of claim 9, wherein at least one first cycle and/or at least one second cycle is/are comprised between any two energy saving signals received by the terminal device from the base station.

17. A base station, comprises:
a memory configured to store instructions;
a processor configured to read the instructions in the memory to perform the method according to claim 1.

18. A terminal device, comprises:
a memory configured to store instructions;
a processor configured to read the instructions in the memory to perform followings:
receiving an energy saving signal sent by a base station, wherein the energy saving signal carries energy saving information used to indicate a first configuration of at least one Discontinuous Reception, DRX, cycle to the terminal device, the at least one DRX cycle comprises at least one first cycle and/or at least one second cycle, wherein the first cycle and the second cycle are long cycles and/or short cycles, and the first cycle is different from the second cycle; the first configuration of the DRX cycle comprises at least one of a maximum quantity N of DRX cycles, a maximum quantity K of first cycles or a quantity Y of first cycles, wherein all of N, K and Y are integers greater than or equal to 1;
wherein in response to the first configuration of the DRX cycle comprising the maximum quantity N of DRX cycles, the energy saving information is used to indicate at most N DRX cycles after the energy saving signal currently sent by the base station to the terminal device, wherein the at most N DRX cycles comprise at least one first cycle and/or at least one second cycle, a quantity of DRX cycles indicated by the energy saving signal is N1, a quantity of DRX cycles indicated by an energy saving signal previously sent by the base station to the terminal device is N2, N1 and N2 are same with each other or different from each other, N1 is less than or equal to N, and N2 is less than or equal to N;
in response to the first configuration of the DRX cycle comprising the maximum quantity K of first cycles, the energy saving information is used to indicate at most K first cycles after the energy saving signal currently sent by the base station this time; a quantity of DRX cycles indicated by the energy saving signal currently sent is K1, a quantity of DRX cycles indicated by an energy saving signal previously by the base station to the terminal device is K2, K1 and K2 are same with each other or different from each other, K1 is less than or equal to K, and K2 is less than or equal to K;
in response to the first configuration of the DRX cycle comprising the quantity Y of first cycles, the energy saving information is used to indicate a configuration of Y first cycles after the energy saving signal currently sent by the base station.

* * * * *